(No Model.)
C. W. PARSONS.
DRIVE CHAIN AND SPROCKET WHEEL.
No. 562,739. Patented June 23, 1896.
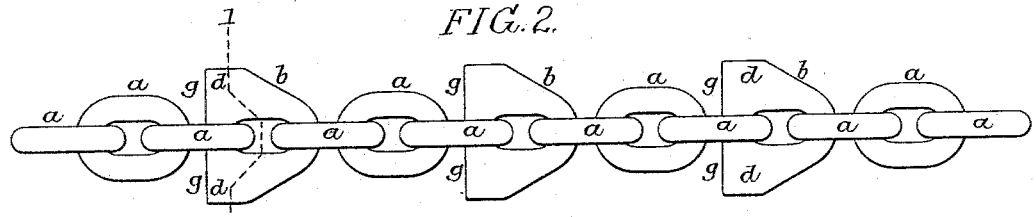
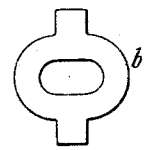
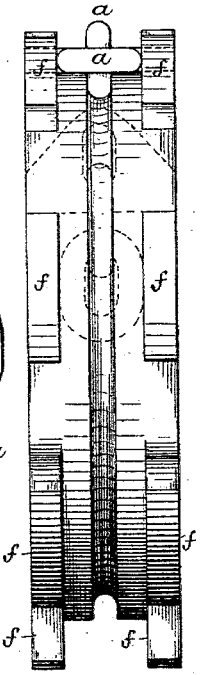
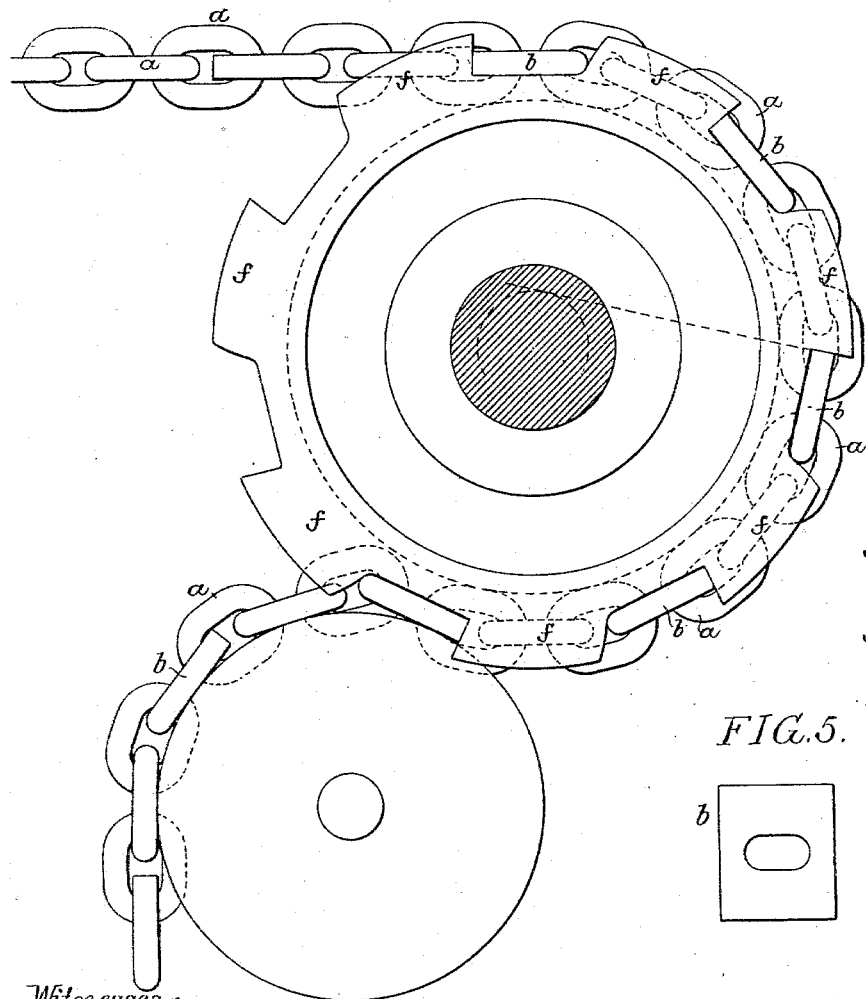
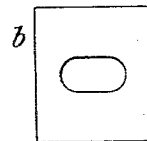
Witnesses:
Fred D. Goodwin
A. V. Groupe
Inventor:
Calvin W. Parsons
By his Attorneys
Howson & Howson

UNITED STATES PATENT OFFICE.

CALVIN W. PARSONS, OF SCRANTON, PENNSYLVANIA.

DRIVE-CHAIN AND SPROCKET-WHEEL.

SPECIFICATION forming part of Letters Patent No. 562,739, dated June 23, 1896.

Application filed July 15, 1891. Serial No. 399,615. (No model.)

*To all whom it may concern:*

Be it known that I, CALVIN W. PARSONS, a citizen of the United States, and a resident of Scranton, Lackawanna county, Pennsylvania, have invented certain Improvements in Drive-Chains and Sprocket-Wheels, of which the following is a specification.

The object of my invention is to so construct a drive-chain and sprocket-wheel that a firm grip of the parts one upon the other will be insured and rapid wear of the engaging links of the chain or of the teeth of the sprocket-wheel will be prevented; and this object I attain in the manner hereinafter set forth, reference being had to the accompanying drawings, in which—

Figure 1 is a side view of a sprocket-wheel and drive-chain constructed in accordance with my invention. Fig. 2 is a plan view of part of the chain. Fig. 3 is a side elevation of the sprocket-wheel. Fig. 4 is a section on the line 1 2, Fig. 2; and Figs. 5 and 6 are views illustrating modified forms of links of the chain.

The chain is composed in part of links $a$ of ordinary character and in part of special links $b$, which constitute the drive-links of the chain, these drive-links being formed by preference without welding, that is to say, they may be made of malleable cast-iron, or cast-steel, or may be punched from plates, strips, or bars of wrought iron or steel, or may be drop-forged, the ordinary links being welded to form the chain, and such welding being preferably done by the well-known process of electric welding.

Each of the special links $b$ has straight-faced lateral wings $d$ projecting beyond the side edges of the ordinary links $a$, which lie in the same plane as the links $b$, or if the special links $b$ constitute every other link of the chain these lateral projections will be of such width as to engage with the teeth $f$ of the sprocket-wheel, these teeth being formed upon opposite sides of the central grooved or recessed portion of the wheel which receives the ordinary links of the chain, as shown, for instance, in Fig. 3, the main difference between the links $b$ and the ordinary oval chain-links being that they project laterally to such an extent as to engage with the sprocket-teeth lying alongside of said ordinary links, and that the front or acting faces $g$ of their laterally-projecting wings are in a plane at right angles to the longitudinal line of the chain, and therefore take a firm hold upon the teeth of the sprocket-wheel and prevent excessive wear either of said teeth or of the drive-links of the chain, both teeth and links being capable of being made large and strong, so as to be free from danger of accidental breakage and so as to wear for a long time without undue weakening. The chain, it will be seen, has its successive links in plane at right angles to each other.

In order to overcome any tendency of the links to pull off of the teeth of the wheel, the faces of said teeth upon which the links act are made in a plane tangential to a circle having a radius equal to half the length of the link, as shown by dotted lines in Fig. 1, so that the tendency of each drive-link from the time it first engages with the tooth, until it finally leaves the same, is to draw in toward the root of the tooth rather than to slip off of the same.

In cases where the drive motion is in both directions I make the special links $b$ of the chain with right-angled acting faces $g$ at each end, as shown in Fig. 5, for instance, or I make the links with rectangular projections at each side, as shown in Fig. 6, the teeth of the sprocket-wheel being constructed accordingly.

It will be evident that in a chain and sprocket-wheel constructed in accordance with my invention the large surfaces engaged and the squareness of the contacts will render the chain extremely durable and efficient, and while these results are attained the chain is yet as flexible as an ordinary chain and will run around common sheaves, merely requiring a deeper center groove where it is to run edgewise, the chain being especially applicable for use in the different varieties of cranes in which chains are used, and for hauling purposes generally, the use of the chain enabling me to dispense with the chain-barrels employed in crane structures and to overcome the well-known objections to such chain-barrels.

The links having the lateral projections for engaging with the teeth of the sprocket-wheel may be applied to chains of any style of articulation, without departing from the main feature of the invention.

In hauling or hoisting chains for cranes and like structures only that part of the chain which actually passes around the sprocket-wheel may be provided with the special drive-links, the rest of the chain being made up of ordinary links.

Having thus described my invention, I claim and desire to secure by Letters Patent—

The combination in driving or hauling mechanism, of a sprocket-wheel having, at each side, projecting straight-faced teeth, with a drive-chain having its successive links in planes at right angles to each other so that the chain is freely flexible in all directions, the drive-links of the chain having lateral projections extending beyond the sides of the connecting-links and having acting faces which are substantially at right angles to the line of the chain, and the teeth of the sprocket-wheel having engaging faces which are on lines tangential to a circle having a radius equal to half the length of the links, substantially as specified.

In testimony whereof I have signed my name to this specification in the presence of two subscribing witnesses.

CALVIN W. PARSONS.

Witnesses:
H. M. WALTON,
H. H. EATON.